US010756912B2

(12) United States Patent
Balasaygun et al.

(10) Patent No.: US 10,756,912 B2
(45) Date of Patent: Aug. 25, 2020

(54) DISTRIBUTED LEDGER AND BLOCKCHAIN TO CONFIRM VALIDITY OF CALL RECORDINGS

(71) Applicant: Avaya Inc., Santa Clara, CA (US)

(72) Inventors: Mehmet Balasaygun, Freehold, NJ (US); Joel Ezell, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 1 day.

(21) Appl. No.: 16/159,368

(22) Filed: Oct. 12, 2018

(65) Prior Publication Data

US 2020/0119936 A1 Apr. 16, 2020

(51) Int. Cl.
| | |
|---|---|
| *G06F 15/16* | (2006.01) |
| *H04L 12/18* | (2006.01) |
| *H04L 9/06* | (2006.01) |
| *G06F 16/27* | (2019.01) |
| *G06F 16/182* | (2019.01) |

(52) U.S. Cl.
CPC ...... *H04L 12/1831* (2013.01); *G06F 16/1824* (2019.01); *G06F 16/27* (2019.01); *H04L 9/0643* (2013.01); *H04L 2209/38* (2013.01)

(58) Field of Classification Search
CPC .............. H04L 12/1831; H04L 9/0643; H04L 2209/38; G06F 16/27; G06F 16/1824

USPC ........................................................ 709/204
See application file for complete search history.

(56) References Cited

U.S. PATENT DOCUMENTS

| | | | |
|---|---|---|---|
| 10,298,585 B1 * | 5/2019 | Treat ..................... | G06Q 20/06 |
| 2017/0206523 A1 | 7/2017 | Goeringer et al. | |
| 2018/0032759 A1 | 2/2018 | Radocchia et al. | |
| 2019/0281465 A1 * | 9/2019 | Moshir ............... | H04L 63/0428 |
| 2019/0289046 A1 * | 9/2019 | Weber ................. | H04L 65/4053 |
| 2019/0303951 A1 * | 10/2019 | Bakalis .................... | G06K 7/12 |

* cited by examiner

*Primary Examiner* — Frantz B Jean
(74) *Attorney, Agent, or Firm* — Sheridan Ross P.C.

(57) ABSTRACT

A conference call is recorded. For example, a voice conference call between a group of users is recorded. Information about the recording of the conference call is identified. For example, a date, a time, a length, an agenda, and a list of participants are identified for the conference call. A block is added to a blockchain with the information about the recording of the conference call. The blockchain with the information about the recording of the conference call is sent to a distributed ledger. The distributed ledger is where copies of the blockchain are stored on multiple nodes on one or more networks. By having multiple copies distributed in one or more networks, it is much more difficult to remove all the information that the conference call actually took place.

20 Claims, 6 Drawing Sheets

DISTRIBUTED LEDGER AND BLOCKCHAIN TO CONFIRM VALIDITY OF CALL RECORDINGS

BACKGROUND

In today's communications systems, media recording is controlled and access to recorded content is managed by a call recording system. Today's call recording systems typically use a centralized database that collects metadata information about the call recording. The metadata may include a call participants' identity, a call duration, a subject, attributes of the call, and additional keywords that can be derived from processing of the call recording.

One of the problems with the current call recording systems is that a disgruntled employee or administrator who has privileged access to the call recording system can potentially alter the content of the call recordings and can also delete the call recordings without necessarily leaving any trace of the incident.

SUMMARY

These and other needs are addressed by the various embodiments and configurations of the present disclosure. A conference call is recorded. For example, a voice conference call between a group of users is recorded. Information about the recording of the conference call is identified. For example, a date, a time, a length, an agenda, and a list of participants are identified for the conference call. A block is added to a blockchain with the information about the recording of the conference call. The blockchain with the information about the recording of the conference call is sent to a distributed ledger. The distributed ledger is where copies of the blockchain are stored on multiple nodes on one or more networks. By having multiple copies distributed in one or more networks, it is much more difficult to remove all the information that the conference call actually took place.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The terms "determine", "calculate" and "compute," and variations thereof, as used herein, are used interchangeably and include any type of methodology, process, mathematical operation or technique.

The term "conference call" as described herein and in the claims can be any voice, video (typically with a corresponding audio stream), chat, or Instant Messaging (IM) communication session between two or more people, or a communication session between a person and a device (e.g., a voicemail/videomail system/Interactive Voice Response (IVR) system). A video conference call may include a video communication session, a multimedia communication session, a virtual reality communication session (e.g., where movable avatars represent users), a gaming session, and/or the like. A conference call can be established using a conference bridge where participants call into the conference bridge to establish the conference call. A conference call may be a peer-to-peer conference call.

The term "distributed ledger" as described herein and in the claims comprises a plurality of separate blockchains that are stored on different network elements, such as, on separate servers, on separate communication managers, in separate databases and/or on separate network elements, on separate devices, and/or the like. The separate blockchains may reside on different types of network elements. For example, the blockchains may reside on a communication manager and a database on another network element, such as a router. The separate blockchains are copies.

The distributed ledger is setup so that when there is any change made to a blockchain (i.e., a newly added block based on a transaction) that the changes are automatically sent to the other elements of the distributed ledger. If the blockchain has been changed (e.g., where a blockchain was tampered with), the change is immediately detected by the distributed ledger. When a change is made to a blockchain, a signature is verified based on a signature of the blockchain. When a node with the blockchain verifies that the newly added block is valid, it is broadcast to the other nodes. When more than a specific percentage of the nodes agree that the block is valid, they all add the new block to the blockchain.

The term "blockchain" as described herein includes multiple copies of the blockchain in a distributed ledger.

The term "means" as used herein shall be given its broadest possible interpretation in accordance with 35 U.S.C., Section 1.12(f) and/or Section 112. Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
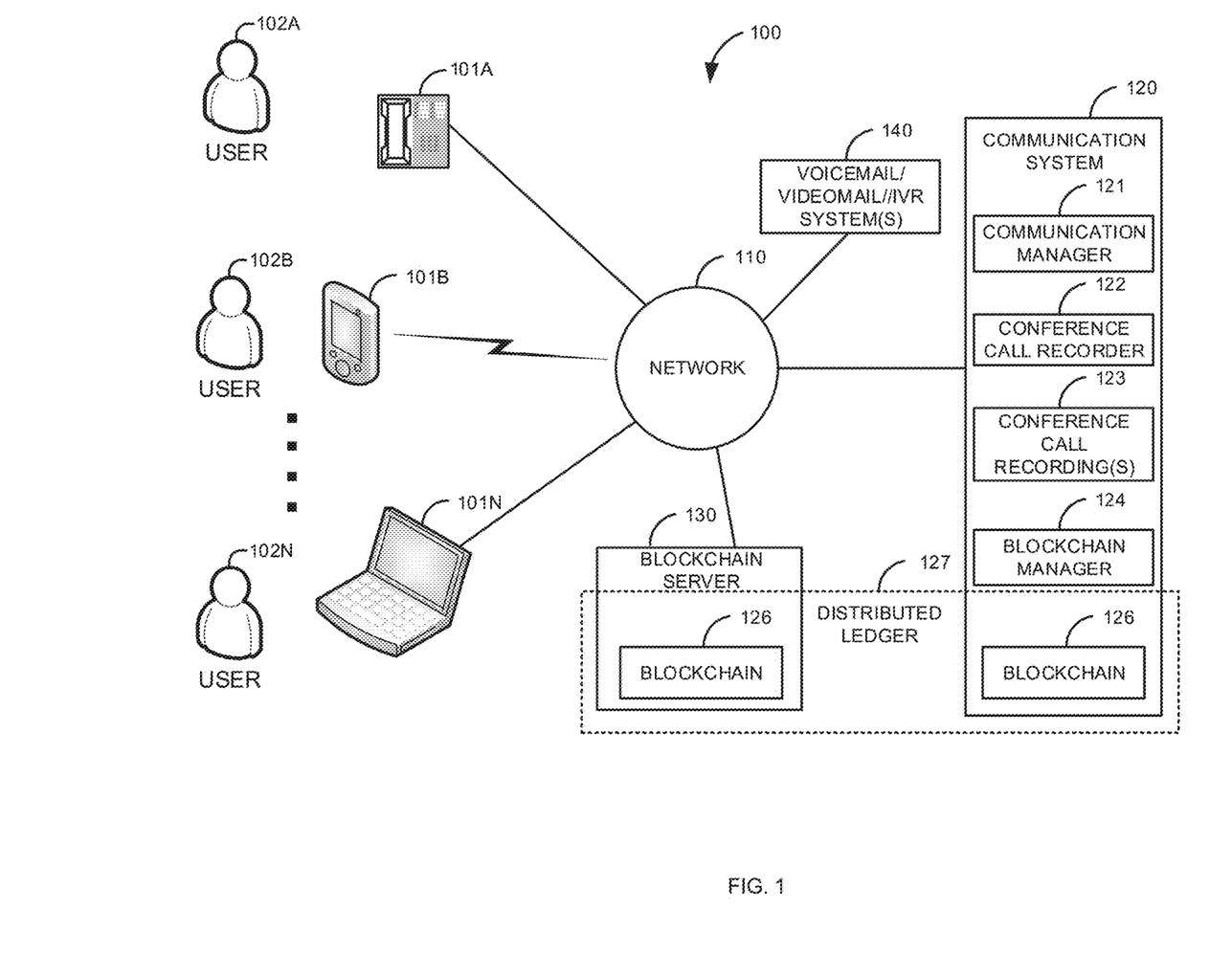
FIG. 1 is a block diagram of a first illustrative system for using a distributed ledger and a blockchain to confirm validity of conference call recordings.

FIG. 1 is a block diagram of a first illustrative system 100 for using a distributed ledger 127 and a blockchain 126 to confirm validity of conference call recordings 123. The first illustrative system 100 comprises communication endpoints 101A-101N, a network 110, a communication system 120, a blockchain server 130, and a voicemail/videomail/Interactive Voice Response (IVR) system 140. In addition, the communication endpoints 101A-101N also have users 102A-102N.

The communication endpoints 101A-101N can be or may include any user communication endpoint device that can communicate on the network 110, such as a Personal Computer (PC), a telephone, a video system, a cellular telephone, a Personal Digital Assistant (PDA), a tablet device, a notebook device, a smartphone, a conferencing system, a gaming system, a virtual reality system, and/or the like. The communication endpoints 101A-101N are user devices at which a communication sessions ends. The communication endpoints 101A-101N are not network elements that facilitate and/or relay a communication session in the network 110, such as a communication manager 121 or router. As shown in FIG. 1, any number of communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a corporate network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, and/or the like. Thus, the network 110 is an electronic communication network configured to carry messages via packets and/or circuit switched communications.

The communication system 120 can be or may include any hardware coupled with firmware/software that can provide and manage communication sessions on the network 110, such as, a Private Branch Exchange (PBX), a router, a proxy server, a central office switch, a contact center, and/or the like. The communication system 120 further comprises a communication manager 121, a conference call recorder 122, conference call recording(s) 123, a blockchain manager 124, and a blockchain 126.

The communication manager 121 can be or may include any hardware coupled with firmware/software that can manage and help establish communication sessions on the network 110, such as, a PBX, a session manager, a router, a proxy server, and/or the like. The communication manager 121 can manage various types of communication sessions, such as voice, video, multimedia (a type of video), virtual reality (a type of video), gaming (a type of video), Instant Messaging (IM), email, a text messaging, and/or the like.

The conference call recorder 122 can be or may include any hardware coupled with firmware/software that can record a conference call. The conference call recorder 122 may record various types of conference calls, such as, a voicemail, a videomail, a voice conference call, a video conference call (e.g., with a corresponding audio stream), a voice contact center conference call, a video contact center conference call, a multimedia conference call, a virtual reality conference call, a gaming conference call, an interactive voice response system interaction, an instant messaging conference call, a contact center instant messaging conference call, and/or the like.

The conference call recording(s) 123 are recording(s) of the conference calls made by the conference call recorder 122. Although the conference call recorder 122/conference call recording(s) 123 are shown in the communication system 120, the conference call recorder 122/conference call recording(s) 123 may reside outside the communication system 120 (e.g., on the network 110).

The blockchain manager 124 can be or may include any firmware/software that can manage a blockchain 126 in a distributed ledger 127. In one embodiment, the blockchain manager 124 may reside external to the communication system 120 or may be distributed. For example, the blockchain manager 124 may be distributed between the communication system 120 and the blockchain server 130.

The blockchain 126 is associated with call recordings 123 as they occur over time. The blockchain 126 comprises information about the conference call recording(s) 123 as they occur over time, such as, a time of the recording, a date of the recording, a length of the recording, names of one or more participants in the conference call, a location of the one or more participants in the conference call (e.g., a physical location of where the one or more participants were at during the conference call), a recipient of a videomail or voicemail, a hash of the conference call recording 123, one or more avatars used in the conference call (e.g., during a gaming session), one or more interactive voice response menus selected in the conference call, a slide presentation used in the conference call, an indication of use of a slide presentation used in the conference call, an agenda of a slide presentation used in the conference call, additional associated conference calls (e.g., for a periodic conference call), and/or the like. In one embodiment, any of the above may be hashed.

Because of the distributed ledger 127, if one blockchain 126-126 becomes compromised, the compromised blockchain 126 can be automatically detected based on signatures of blocks in the blockchain 126. For example, if a user tries to delete a block from the blockchain 126 (e.g., a block for a conference call recording) in the communication system 120, the distributed ledger 127 can automatically detect the change because a signature made for the new blockchain 126 with the new block will not match the blockchain 126 in the blockchain server 130. As shown in FIG. 1, there are two copies of the blockchain 126 in the distributed ledger 127. However, there may be any number of copies of the blockchain 126 in the distributed ledger 127.

In one embodiment, the blockchain 126 in the communication system 120 may have different user access privileges than the blockchain 126 in the blockchain server 130. This prevents a single administrator from being able to change both blockchains 126 to try and modify a blockchain 126.

The blockchain 126 typically does not include large blocks of information because of the difficulty of verifying large blocks of information. For example, a call recording of a video conference call may be very large and require large amounts of processing power to compare blockchains 126 in a distributed ledger 127. One way to overcome this issue is to use a hash of the conference call.

However, in one embodiment, the call recording 123 may be stored as record in the blockchain 126 so that if another blockchain 126 in the distributed ledger 127 has become compromised (e.g., the block for a conference call recording has been deleted from the blockchain 126), the call recording 123 can be restored.

The blockchain server 130 is any server/network element that can store the blockchain 126. For example, the blockchain server 130 may be on a router, a server, in the voicemail/videomail/IVR system 140, and/or the like.

The voicemail/videomail/IVR system 140 can be or may include any system that can record and/or store voice/video mails (a conference call recording 123). For example, the voicemail/videomail/IVR system 140 may record voicemails/videomails left for an individual user 102. The voicemail/videomail functionality may be in a separate device than the IVR functionality.

In addition, the voicemail/videomail/IVR system 140 may record a user's interaction with an IVR system (also a conference call recording 123). For example, the IVR system 140 may be in a contact center that records a conversation (video and/or audio) between a user 102 and the IVR system 140. The voicemail/videomail/IVR system 140 may record specific IVR menus selected by a user 102 (e.g., selected using Dual Tone Multi Frequency (DTMF) tones or voice commands).

Figure 2:
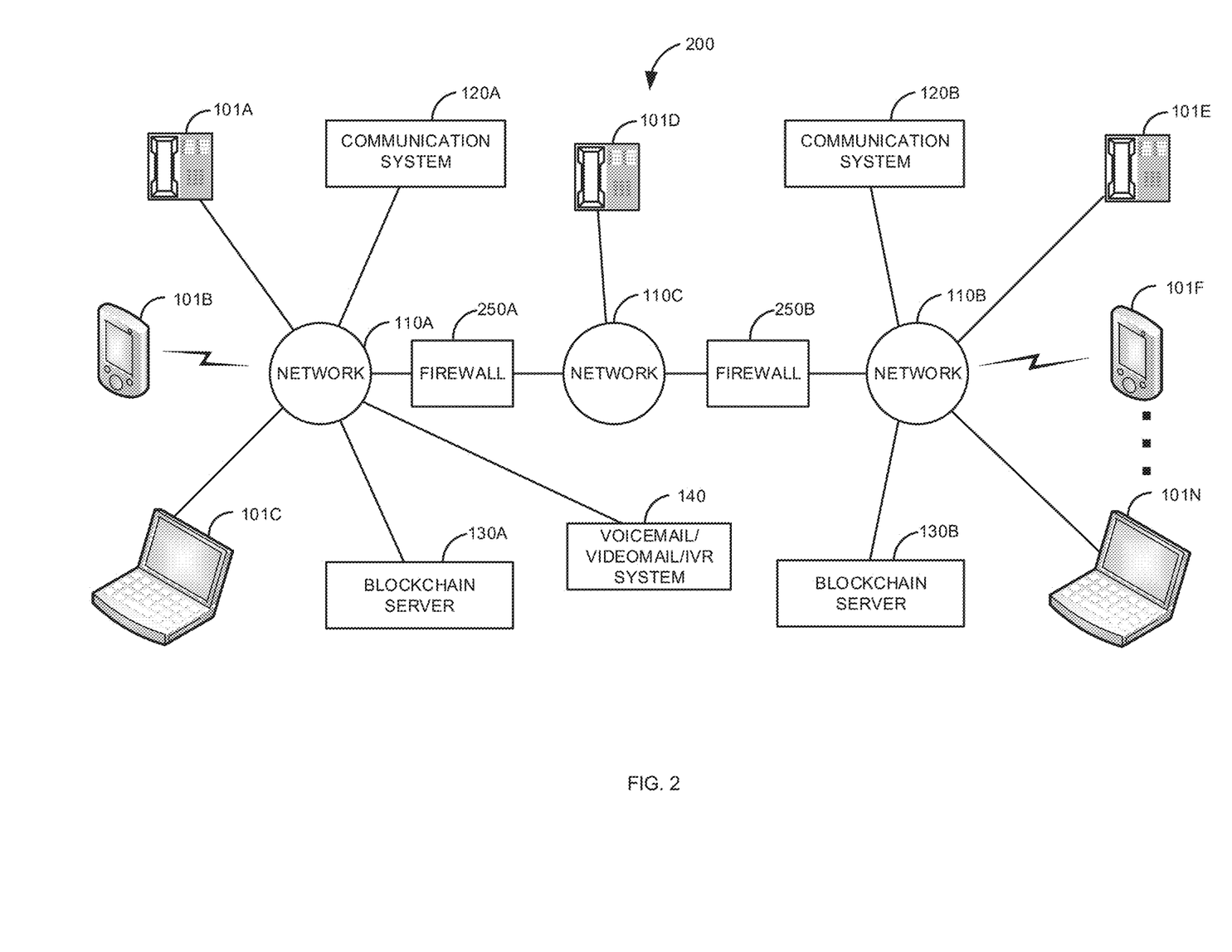
FIG. 2 is a block diagram of a second illustrative system for using a distributed ledger and a blockchain to confirm validity of conference call recordings.

FIG. 2 is a block diagram of a second illustrative system 200 for using a distributed ledger 127 and a blockchain 126 to confirm validity of conference call recordings 123. The second illustrative system 200 comprises the communication endpoints 101A-101N, networks 110A-110C, communication systems 120A-120B, blockchain servers 130A-130B, voicemail/videomail/IVR system 140, and firewalls 250A-250B.

Although not shown in FIG. 2 for convenience, the communication systems 120A-120B typically comprise the elements 121-124 and 126. However, both the communication systems 120A-120B may not have all of the elements 121-124 and 126. For example, one or both of the communication systems 120A-120B may not have a conference call recorder 122, conference call recording(s) 123, and/or a blockchain manager 124.

Although not shown in FIG. 2 for convenience, the blockchain servers 130A-130B each have a corresponding blockchain 126 that are part of the distributed ledger 127

(along with any blockchains 126 in the communication system 120A-120B). In FIG. 2, the distributed ledger 127 is distributed in the networks 110A-110B. In the example of FIG. 2, there are four blockchains 126 (one in each of the communication systems 120A-120B and one in each the blockchain servers 130A-130N). In essence, there are four separate copies of the blockchain 126.

In FIG. 2, the networks 110-110C can be any type of network 110 as described in FIG. 1. However, the networks 110A-110B may be separate networks 110A-110B of an entity, such as a corporation or organization. The network 110C may be a public network, such as, the Internet or the PSTN.

As shown in FIG. 2, specific number(s) communication endpoints 101A-101C, are connected to the individual networks 110A-110C. However, any number of communication endpoints 101 may be connected to any of the networks 110A-110C.

The networks 110A/110C and 110C/110B are connected to each other via firewalls 250A-250B. The firewalls 250A-250B are used to protect the networks 110A/110B from unwanted access from the network 110C. For example, to prevent hacking of the networks 110A-110B. The firewalls 250A-250B may be any hardware coupled with firmware/software that can protect the networks 110A-110B, such as a network address translator, a Session Boarder Controller, a port/internet firewall, and/or the like.

The distributed system of FIG. 2 allows flexibility in the distributed ledger 127. For example, based on a conference call recording 123 that is recorded by a conference call recorder 122 in the communication system 120A, each of the communication systems 120A-120B/blockchain servers 130A-130B will have copies of the blockchain 126 for all call recordings made by the conference call recorder 122 in the communication system 120A. Likewise, when a conference call recorder 122 in the communication system 120B records a conference call, each of the communication systems 120A-120B/blockchain servers 130A-130B will have copes of the blockchain 126 for all the conference call recordings made by the conference call recorder 122 in the communication system 120B.

Figure 3:
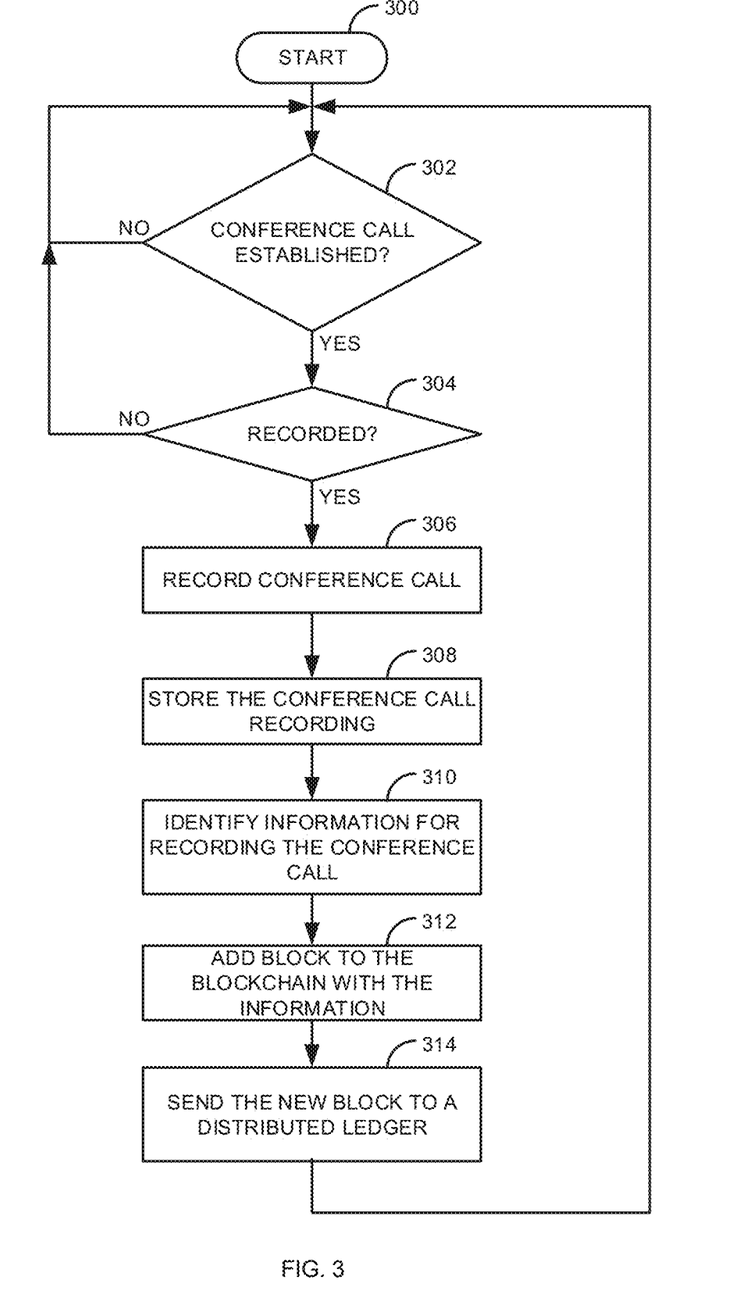
FIG. 3 is a flow diagram of a process for using a distributed ledger and a blockchain to confirm validity of conference call recordings.

FIG. 3 is a flow diagram of a process for using a distributed ledger 127 and a blockchain 126 to confirm validity of multiple conference call recordings 123. Illustratively, the communication endpoints 101A-101N, the network 110, the communication system 120, the communication manager 121, the conference call recorder 122, the conference call recordings 123, the blockchain manager 124, the blockchains 126, the distributed ledger 127, the blockchain server 130, the voicemail/videomail/IVR system(s) 140, and the firewall 250 are controlled by one or more stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

The process starts in step 300. The communication manager 121 determines, in step 302, if a conference call has been established. If a conference call has not been established in step 302, the process repeats step 302. Otherwise, if a conference call has been established in step 302, the conference recorder 122 determines, in step 304, if the conference call (or a portion of the conference call) is to be recorded. For example, if a user 102 decides to record the conference call. If the conference call is to not be recorded in step 304, the process goes back to step 302.

Otherwise, if the conference call is to be recorded in step 304, the conference call recorder 122 records, in step 306, the conference call in a conference call recording 123. For example, the conference call recorder 122 may record an IM conference call in step 306. The conference call recorder 122 stores the conference call recording 123 in step 308.

The blockchain manager 124 identifies, in step 310, information associated with the conference call, such as, the conference call recording 123, a time of the conference call, a date of the conference call, a length of the conference call, an agenda of the conference call, names of one or more participants in the conference call, a location of the one or more participants in the conference call, a recipient of a videomail or voicemail, a hash of the conference call recording 123, one or more avatars used in the conference call, one or more interactive voice response menus selected in the conference call, a slide presentation used in the conference call, an agenda of the conference call (e.g., from a slide presentation), and/or the like. The identified information may include various combinations/subsets of the information associated with the conference call recording 123. For example, different conference call parameters may be used based on administered preferences, predefined preferences, defined rules, and/or the like.

The blockchain manager 124 adds, in step 312, a new block to the blockchain 126 with the conference call information based on the conference call recording 123. For example, the blockchain 126 created by the blockchain manger 124 in step 312 may include the time of the conference call, the date of the conference call, the length of the conference call, names of participants in the conference call, a hash of the conference call and a pointer to the recorded conference call 123, and/or the like. The blockchain manager 124 the sends, in step 314, the added block to the distributed ledger 127. For example, as shown in FIG. 1, the added block is sent to and stored in both the blockchain server 130 and the communication system 120 in the distributed ledger 127. In FIG. 2, added block is sent to the communication systems 120A-120B and the blockchain servers 130A-130B (e.g., four network elements in this example). The process then goes to step 302.

Figure 4:
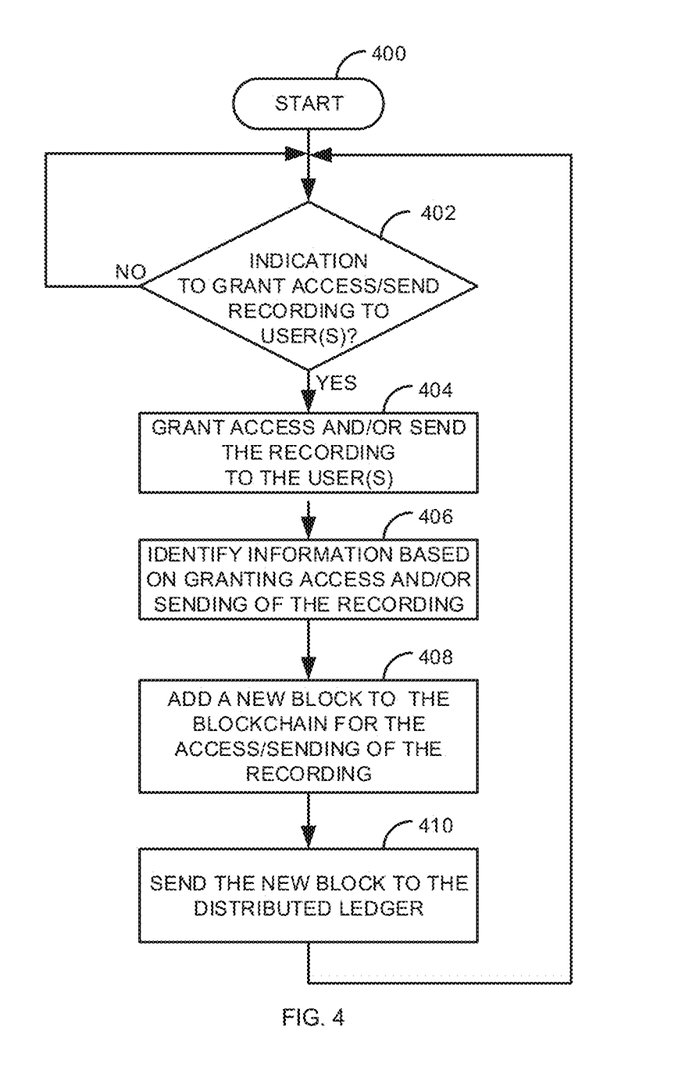
FIG. 4 is a flow diagram of a process for adding additional information to a blockchain based on granting access to and/or sending of a conference call recording.

FIG. 4 is a flow diagram of a process for adding additional information (i.e., in a new block) to a blockchain 126 based on granting access to and/or sending of a conference call recording 123. The process starts in step 400. The conference call recorder 122 determines, in step 402, if there is an indication to grant access and/or send the conference all recording 123 to one or more users 102. For example, the user 102A may decide to send the conference call recording 123 to the users 102B-102N in an email or in an IM communication session. Alternatively, the user 102A (assuming that the user 102A has sufficient rights to do so) may grant the user 102B access to the conference call recording 123. If an indication is not received in step 402, the process goes back to step 402. Otherwise, if the conference call recorder 122 determines, in step 402, that there is an indication to grant access and/or send the conference call recording 123 to one or more users 102, the conference call recorder 122 grants access and/or sends the conference call recording 123 in step 404.

The blockchain manager 124 identifies, in step 406, information associated with granting access and/or sending of the conference call recording 123. The identified information can be any type of information associated with the granting access and/or sending of the conference call recording 123. For example, the information may include one or more of: a name of the user(s) 102 who received the conference call recording 123 or were granted access, a time when the conference call recording 123 was sent, a date when the conference call recording 123 was sent, a location of where the conference call recording 123 was sent, a time when the user 102 listened to or viewed the conference call recording 123, a date when the user 102 listened to or viewed the conference call recording 123, a location where the user 102 listened to or viewed the conference call recording 123, an indication if another user 102 was present when the user 102 listened to or viewed the conference call recording 123, a time and/or date when access was granted, a name of a user 102 who granted access, a name of the user 102 who sent the conference call recording 123, and/or the like.

The blockchain manager 124 adds a new block to the blockchain 126 with the information in step 408. The blockchain manager 124 sends, in step 410, the newly added block to the distributed ledger 127. The process then goes to step 402.

Figure 5:
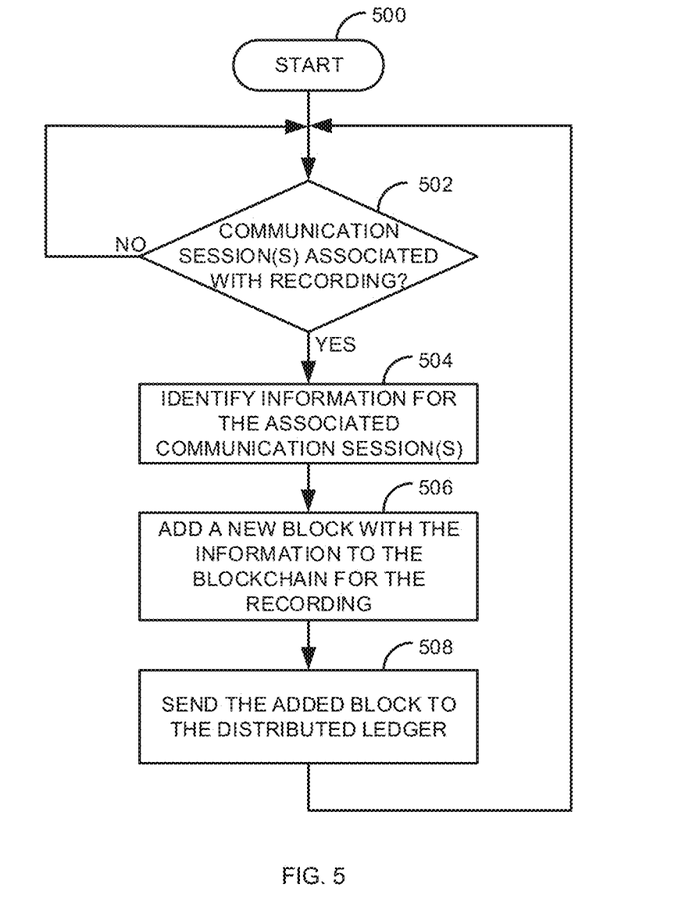
FIG. 5 is a flow diagram of a process for adding additional information to a blockchain based on other communication sessions.

FIG. 5 is a flow diagram of a process for adding additional information to a blockchain 126 based on other communication sessions. The process starts in step 500. The communication manager 121 determines, in step 502, if there are any communication session(s) associated with the conference call recording 123. For example, a user 102 may have left a voicemail (the conference call recording 123) and sent a follow-up email that mentions the voicemail. How the communication session(s) are associated with the conference call recording 123 can be accomplished in various ways. Keywords may be used to identify that the communication session of step 502 is associated with the conference call recording 123. For example, the keyword "Project X" spoken in a voice call may be used to associate the voice call with a conference call recording 123 that discussed Project X. Other types of parameters may be used to associate a communication session with a conference call recording 123, such as, a group of defined users 102 (e.g., a group associated with a project), objects displayed in a video communication session (e.g., a sign), gestures made in a video communication session, attachments in an email or IM session (e.g., where the attachment is the conference call recording 123), an communication session where it is stated that access has been granted to the conference call recording 123, a periodic conference call, and/or the like.

If there are not any communication sessions associated with the conference call recording 123 in step 502, the process of step 502 repeats. Otherwise, if a communication session is associated with the conference call recording 123 in step 502, the blockchain manager 124 identifies, in step 504, information associated with the communication session, such as, participants in the communication session, a type of the communication session (e.g., voice, video, email, IM, text messaging, multimedia, gaming, virtual reality, etc.), a time of the communication session, a date of the communication session, text of the communication session, a recording of the communication session, the name of the user 102 who left a voicemail/videomail, menus selected in a IVR system 140, avatars used in a gaming session, a slide presentation used in the communication session, an indication of use of a slide presentation used in the communication session, an agenda of a slide presentation used in the communication session, and/or the like.

The blockchain manager 124 adds, in step 506, a new block with the information to the blockchain 126 for the communication session associated with the conference call recording 123. The new block is then sent to the distributed ledger 127 in step 508 to be added to the blockchain 126. The process then goes back to step 502.

Figure 6:
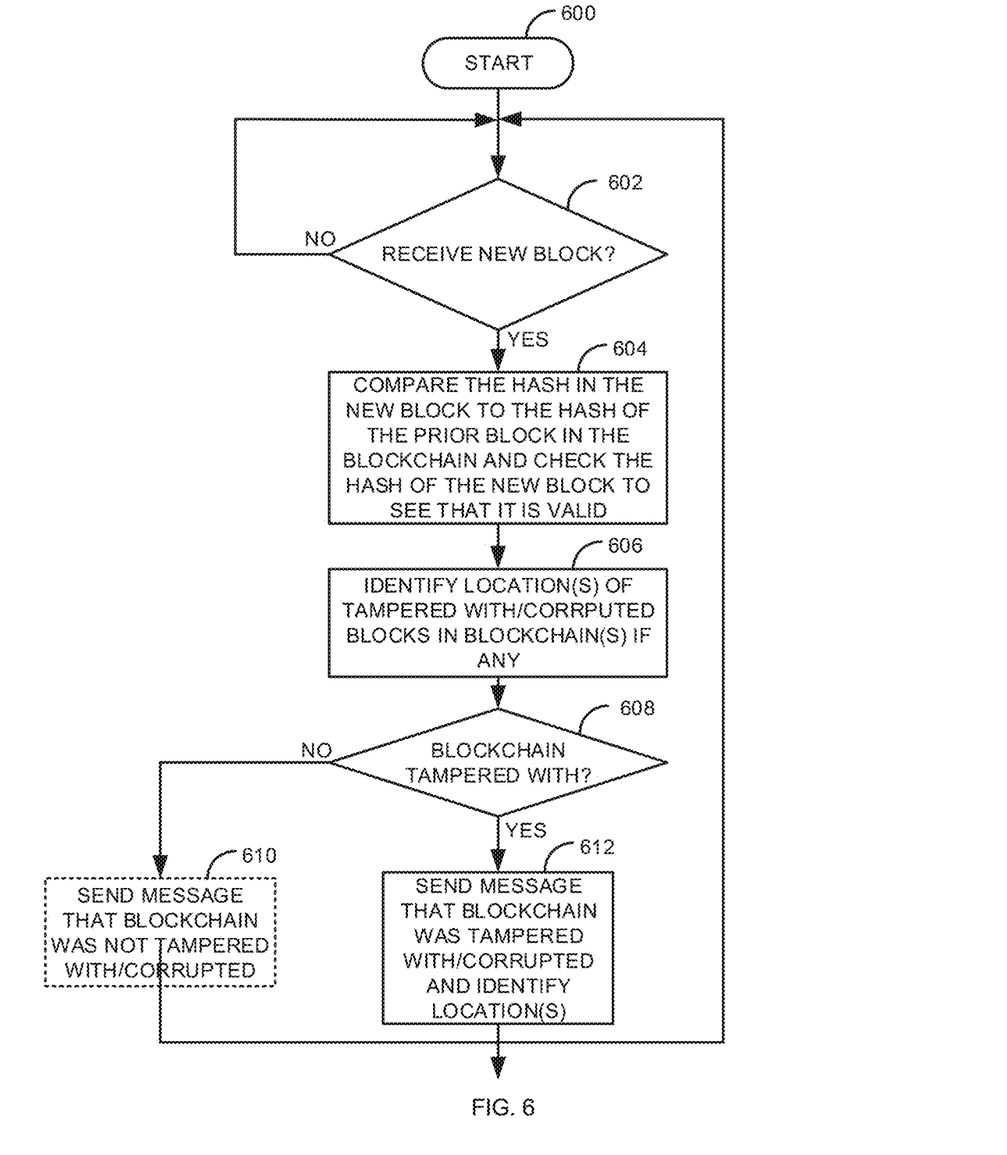
FIG. 6 is a flow diagram of a process for a validating blockchain.

FIG. 6 is a flow diagram of a process for validating a blockchain 126. The process starts in step 600. The blockchain manager 124 determines, in step 602, if a new block has been received that is to be added to the blockchain 126. If a new block has not been received in step 602, the process of step 602 repeats.

Otherwise, if a new block has been received in step 602, the blockchain manager 124 compares a hash of the previous block in the new block with a hash of the previous block in step 604. In addition, the blockchain manager 124 checks the hash of the new block to make sure it is valid. In one embodiment, the process of checking the hash of the prior block may be repeated for each block in the blockchain 126. The blockchain manager 124 identifies, in step 606, the location(s) of any tampered with/corrupted blocks in the blockchain 126 (including the new block). For example, in FIG. 2, if any of the blocks in the blockchain 126 in the communication system 120A is different from any of the blocks in the blockchain 126 in the communication system 120B/blockchain servers 130A-130B, the location (the communication system 120A) is identified in step 606.

If one or more of the blocks has been tampered with in step 608, the blockchain manger 124 sends, in step 612, a message that one or more blocks of the blockchain 126 have been tampered with and identifies the location(s) of where the blockchain 126 has been tampered with. For example, the blockchain manager 124 may send the message to a system administrator in step 612. The process then goes to step 602. Otherwise, if none of the blocks in the blockchain 126 have been tampered with in step 608, the blockchain manager 124 optionally sends, in step 610, a message that the blockchain 126 was not tampered with. The process then goes to step 602.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer-readable medium coupled with the microprocessor, the computer-readable medium comprising microprocessor-readable and executable instructions that program the microprocessor to:
create a recording of a conference call;
identify first information associated with the recording of the conference call;
in response to identifying the first information, create a first new block, wherein the first new block comprises the first information;
send the first new block with the first information to a digital ledger;
determine an indication of access of a first user to the recording of the conference call; and
in response to determining the indication of access, send a second new block to the digital ledger, wherein the second new block comprises second information, wherein the second information is associated with the first user.

2. The system of claim 1, wherein the digital ledger is a distributed ledger, and wherein the recording of the conference call is one of: a voicemail, a videomail, a voice conference call, a video conference call, a voice contact center conference call, a video contact center conference call, a multimedia conference call, a virtual reality conference call, a gaming conference call, an interactive voice response system interaction, an instant messaging conference call, and a contact center instant messaging conference call.

3. The system of claim 1, wherein the first information in the first new block comprises at least one of: a time of the recording of the conference call, a date of the recording of the conference call, a length of the recording of the conference call, an agenda of the conference call, names of one or more participants in the conference call, a location of the one or more participants in the conference call, a recipient of a videomail or voicemail, a slide presentation used in the conference call, an indication of use of the slide presentation used in the conference call, an agenda of the slide presentation used in the conference call, and a hash of the recording of the conference call.

4. The system of claim 1, wherein the first information in the first new block comprises at least one of: a hash of a time of the recording of the conference call, a hash of a date of the recording of the conference call, a hash of a length of the recording of the conference call, a hash of an agenda of the conference call, a hash of names of one or more participants in the conference call, a hash of a location of the one or more participants in the conference call, a hash of a recipient of a videomail or voicemail, a hash of a slide presentation used in the conference call, and a hash of an agenda of the slide presentation used in the conference call.

5. The system of claim 1, wherein the first information in the first new block comprises at least one of: a recording of the conference call, one or more avatars used in the conference call, and one or more interactive voice response menus selected in the conference call.

6. The system of claim 1, wherein the digital ledger is a distributed ledger and wherein the microprocessor readable and executable instructions further program the microprocessor to:
receive an indication the recording of the conference call has been sent to a second user;
identify third information for the recording of the conference call, wherein the third information is based on the sending of the recording of the conference call to the second user;
create a third new block comprising the third information; and
send the third new block to the distributed ledger.

7. The system of claim 1, wherein the second information comprises at least one of: a name of the first user, a time when the recording of the conference call was sent, a date when the recording of the conference call was sent, a location of where the recording of the conference call was sent, a time when the first user one or more of listened to and viewed the recording of the conference call, a location where the first user one or more of listened to and viewed the recording of the conference call, an indication if another user was present when the first user one or more of listened to and viewed the recording of the conference call, a time when access was granted, and a date when access was granted.

8. The system of claim 1, wherein the digital ledger is a distributed ledger and wherein the microprocessor readable and executable instructions further program the microprocessor to:
identify one or more additional communication sessions that are associated with the conference call;
identify third information for the one or more additional communication sessions that are associated with the conference call;
create a third new block comprising the third information; and
send the third new block to the distributed ledger.

9. The system of claim 1, wherein the digital ledger is a distributed ledger, wherein the distributed ledger resides on a first network and a second network, and wherein the first network and the second network are separated by a public network.

10. The system of claim 1, wherein the digital ledger is a distributed ledger and wherein the microprocessor readable and executable instructions further program the microprocessor to:
determine that the distributed ledger has been compromised; and
in response to determining that the distributed ledger has been compromised, create a notification that the distributed ledger has been compromised.

11. A method comprising:
creating, by a microprocessor, a recording of a conference call;
identifying, by the microprocessor, first information associated with the recording of the conference call;
in response to identifying the first information, creating, by the microprocessor, a first new block, wherein the first new block comprises the first information;
sending, by the microprocessor, the first new block with the first information to a digital ledger;
determining an indication of access of a first user to the recording of the conference call; and
in response to determining the indication of access, sending a second new block to the digital ledger, wherein the second new block comprises second information, wherein the second information is associated with the first user.

12. The method of claim 11, wherein the digital ledger is a distributed ledger and wherein the recording of the conference call is one of: a voicemail, a videomail, a voice conference call, a video conference call, a voice contact center conference call, a video contact center conference call, a multimedia conference call, a virtual reality conference call, a gaming conference call, an interactive voice response system interaction, an instant messaging conference call, and a contact center instant messaging conference call.

13. The method of claim 11, wherein the first information in the first new block comprises at least one of: a time of the recording of the conference call, a date of the recording of the conference call, a length of the recording of the conference call, an agenda of the conference call, names of one or more participants in the conference call, a location of the one or more participants in the conference call, a recipient of a videomail or voicemail, a slide presentation used in the conference call, an indication of use of the slide presentation used in the conference call, an agenda of the slide presentation used in the conference call, and a hash of the recording of the conference call.

14. The method of claim 11, wherein the first information in the first new block comprises at least one of: a hash of a time of the recording of the conference call, a hash of a date of the recording of the conference call, a hash of a length of the recording of the conference call, a hash of an agenda of the conference call, a hash of names of one or more participants in the conference call, a hash of a location of the one or more participants in the conference call, a hash of a recipient of a videomail or voicemail, a hash of a slide presentation used in the conference call, and a hash of an agenda of the slide presentation used in the conference call.

15. The method of claim 11, wherein the first information in the first new block comprises at least one of: a recording of the conference call, one or more avatars used in the conference call, and one or more interactive voice response menus selected in the conference call.

16. The method of claim 11, wherein the digital ledger is a distributed ledger and further comprising:
receiving an indication, the recording of the conference call has been sent to a second user;
identifying third information for the recording of the conference call, wherein the third information is based on the sending of the recording of the conference call to the second user;
creating a third new block comprising the third information; and
sending the third new block to the distributed ledger.

17. The method of claim 11, wherein the second information comprises at least one of: a name of the first user, a time when the recording of the conference call was sent, a date when the recording of the conference call was sent, a location of where the recording of the conference call was sent, a time when the first user one or more of listened to and viewed the recording of the conference call, a location where the first user one or more of listened to and viewed the recording of the conference call, an indication if another a third user was present when the first user one or more of listened to and viewed the recording of the conference call, a time when access was granted, and a date when access was granted.

18. The method of claim 11, wherein the digital ledger is a distributed ledger and further comprising:
identifying one or more additional communication sessions that are associated with the conference call;
identifying third information for the one or more additional communication sessions that are associated with the conference call;
creating a third new block comprising the third information; and
sending the third new block to the distributed ledger.

19. The method of claim 11, wherein the digital ledger is a distributed ledger, wherein the distributed ledger resides on a first network and a second network, and wherein the first network and the second network are separated by a public network.

20. The method of claim 11, wherein the digital ledger is a distributed ledger and further comprising:
determining that the distributed ledger has been compromised; and
in response to determining that the distributed ledger has been compromised, creating a notification that the distributed ledger has been compromised.

* * * * *

UNITED STATES PATENT AND TRADEMARK OFFICE
CERTIFICATE OF CORRECTION

PATENT NO. : 10,756,912 B2
APPLICATION NO. : 16/159368
DATED : August 25, 2020
INVENTOR(S) : Mehmet Balasaygun and Joel Ezell Page 1 of 1

It is certified that error appears in the above-identified patent and that said Letters Patent is hereby corrected as shown below:

At Column 16, Lines 24-25, Claim 17, please delete "a third" therein.

Signed and Sealed this
Twenty-ninth Day of September, 2020

Andrei Iancu
*Director of the United States Patent and Trademark Office*